US005355076A

United States Patent [19]
Chadwick

[11] Patent Number: 5,355,076
[45] Date of Patent: Oct. 11, 1994

[54] PHASE CONTROLLED CAPACITOR FOR SERIES COMPENSATION OF A HIGH VOLTAGE TRANSMISSION LINE

[75] Inventor: Philip Chadwick, Peterborough, Canada

[73] Assignee: General Electric Company, Hudson Falls, N.Y.

[21] Appl. No.: 70,018

[22] Filed: Jun. 1, 1993

Related U.S. Application Data

[63] Continuation of Ser. No. 814,707, Dec. 30, 1991, abandoned.

[30] Foreign Application Priority Data

Apr. 25, 1991 [CA] Canada ................... 2041272

[51] Int. Cl.$^5$ ............................... G05F 1/70
[52] U.S. Cl. ................... 323/208; 323/209; 323/218; 307/105; 363/39
[58] Field of Search ............... 323/218, 219, 212, 320, 323/325, 208, 209; 307/105; 333/12, 167, 181; 363/39, 47, 48

[56]         References Cited
U.S. PATENT DOCUMENTS

| 3,529,174 | 9/1970 | Smith ................... 307/43 |
| 4,661,763 | 4/1987 | Ari et al. ............... 323/215 |
| 4,719,402 | 1/1988 | Brennen et al. ....... 323/211 |
| 4,930,064 | 5/1990 | Tanaka et al. ......... 363/161 |
| 5,198,746 | 3/1993 | Gyugyi et al. ......... 323/207 |

FOREIGN PATENT DOCUMENTS 1162977 2/1984 Canada.

Primary Examiner—Steven L. Stephan
Assistant Examiner—Adolf Berhane
Attorney, Agent, or Firm—William Freedman

[57]            ABSTRACT

A compensating circuit arrangement for a power transmission system for rapidly inserting capacitance into a transmission line for desired portions of cycles of the operating frequency of the system, has first anti-parallel connected thyristors in series with a capacitance and second anti-parallel connected thyristors in parallel with the series connected first thyristors and the capacitance. A control responsive to a variable in the system, and related to system reactance, switches desired thyristors on at desired times during a cycle of operating frequency to introduce controlled amounts of capacitance into the power transmission system.

6 Claims, 7 Drawing Sheets

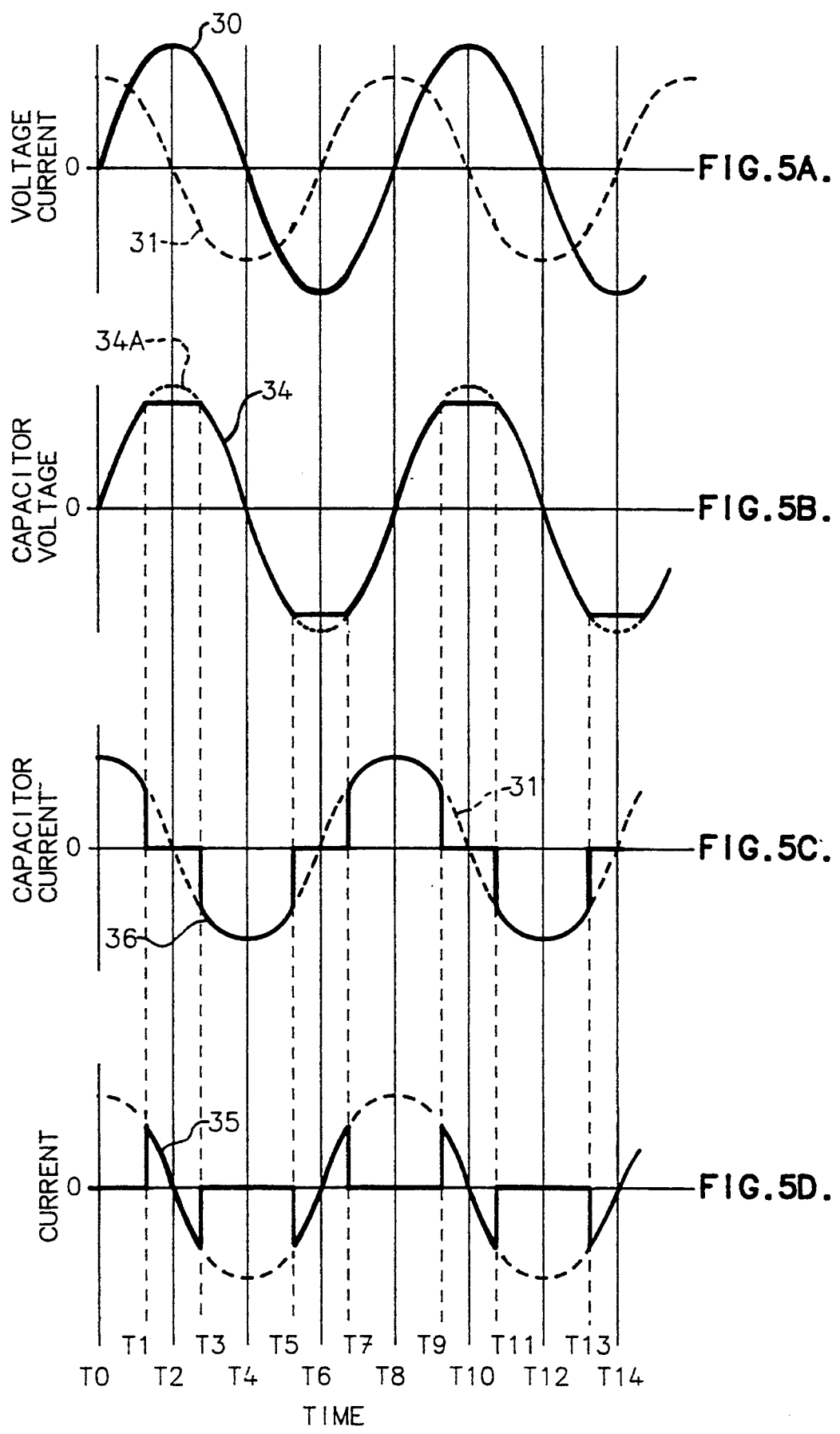

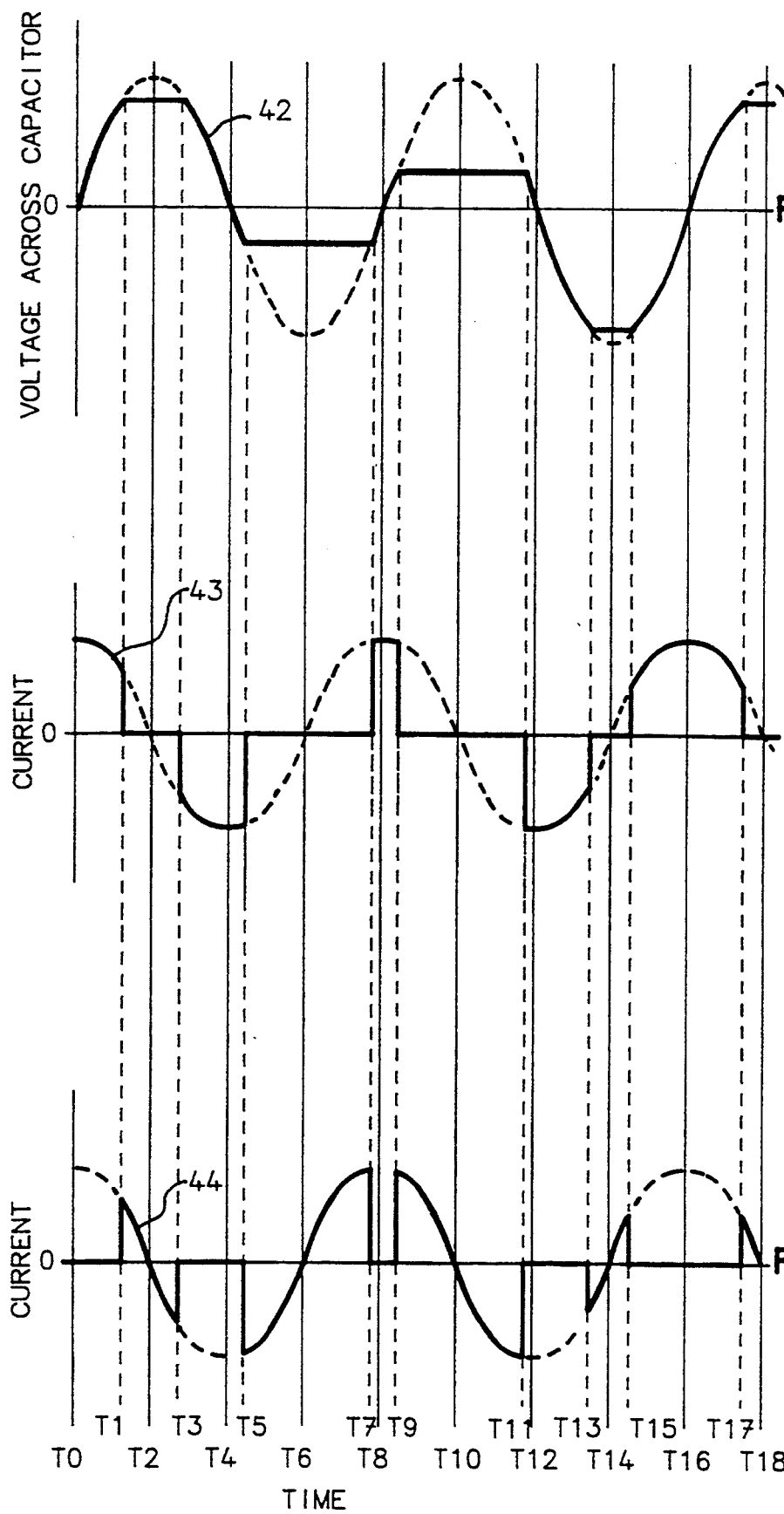

1

PHASE CONTROLLED CAPACITOR FOR SERIES COMPENSATION OF A HIGH VOLTAGE TRANSMISSION LINE

This is a continuation of co-pending application Ser. No. 07/814,707 filed on Dec. 30, 1991, now abandoned.

BACKGROUND OF THE INVENTION

This invention relates to capacitive compensation for a high voltage transmission line, and in particular it relates to a phase controlled capacitor arrangement for series connection in a high voltage transmission line.

The flow of electrical energy between a source and a load, connected by a high voltage transmission line, is determined in part by the impedance between the source and the load, by the voltages involved, and by the phase angle between the voltage at the source and at the load. The following equation represents the transfer of power between a source and a load:

$$P_T = \frac{E_S \cdot E_L}{X} \sin\alpha$$

where
$P_T$ is the transmitted power
$E_S$ is the voltage at the source end
$E_L$ is the voltage at the load end
X is the combination of the reactances of the system between the source and the load
δ is the angle between the voltage at the source end and the voltage at the load It will be seen that theoretically the maximum power is transmitted when the angle delta (δ) is 90 degrees and when the reactance X is relatively low. Other factors, however, limit the power which can be transmitted. For example, while it might seem to be desirable to have the angle delta just less than 90 degrees, this is not practical in a power transmission system. If, for example, the angle delta were just less than 90 degrees, and an additional load were suddenly added which increased the angle delta above 90 degrees, the system would collapse. It is therefore desirable to operate the system with an angle delta considerably less than 90 degrees. Typical power transmission systems may operate with an angle delta of about 30 degrees.

It is desirable to control the angle delta to be as close as possible to a desired value, and to be able to operate any control rapidly for reducing any oscillation in the angle delta or in any other factor that might develop from the sudden addition (or removal) of a load by, for example, the opening or closing of circuit breakers.

U.S. Pat. No. 3,529,174—Smith, issued Sep. 15, 1970, describes a transient control system for controlling oscillations related to the phase angles of the generators which might result from the perhaps temporary opening of circuit breakers to remove a transmission line. This patent teaches the use of a phase shifting transformer, or a parallel capacitor and switch, in series with the transmission line. By opening and closing the switch for desired parts of a cycle, the amount of capacitive reactance inserted in the transmission line can be controlled. However, the opening and closing of a switch in parallel with a capacitor will cause the capacitor to charge or discharge very abruptly, and this will create undesirable oscillations.

A phase shifter for controlling the phase angle between the source and the load is described in U.S. Pat. No. 4,661,763—Ari et al, issued Apr. 28, 1987. This phase shifter uses a resonant circuit between an exciter transformer and an auxiliary transformer. It provides a faster response than previous controls, but the system is relatively complex and expensive.

One method for controlling the power transfer is to change the reactance of the power line, i.e., the system portion between the source and the load. This is conventionally done by inserting or removing series capacitors through the operation of circuit breakers. But a disadvantage of this approach is that the speed of such circuit breakers is not sufficient to damp oscillations of the power system.

SUMMARY OF THE INVENTION

The invention provides a controlled capacitor compensation arrangement for compensating for inherent inductance in a transmission system. The compensation arrangement is able to introduce capacitance into the system in a rapidly and accurately controlled manner to provide for control of reactance and hence the angle delta and to do this rapidly for reducing oscillations which may develop in the system. The controlled capacitor compensation arrangement has a bridge type circuit or partial bridge circuit with anti-parallel thyristors. The thyristors may be used to switch a compensating capacitance into the system for any portion of a cycle of the system frequency or to by-pass the capacitance for any portion of the cycle. The thyristors may be operated rapidly and consequently may control the effective capacitance very quickly and smoothly. This provides means to damp out oscillations or swings in the power system.

It is therefore an object of the invention to provide an improved circuit arrangement for controlling the effective reactance of a series capacitor in a transmission system.

It is another object of the invention to provide a form of bridge circuit, with thyristor switches, for controlling the amount of capacitive impedance in the circuit.

Accordingly there is provided a power transmission system having a source of AC power at a predetermined supply frequency and a load for receiving AC power, the source and the load being connected by a transmission line, the transmission line having inductance and a compensating series capacitor connected therein, and a compensating arrangement for changing the effective reactance of the compensating capacitor in series in the transmission line, the compensating arrangement comprising, first anti-parallel connected thyristors in series with a capacitor, second anti-parallel connected thyristors in parallel with the first thyristors and the capacitor, and control means for controlling the conductance of the thyristors at desired times during each cycle of the supply frequency for changing the effective reactance of the compensating series capacitor.

BRIEF DESCRIPTION OF THE DRAWINGS

The invention will be described with reference to the accompanying drawings, in which FIGS. 5A, 5B, 5C and 5D are waveform diagrams useful in describing the invention, FIGS. 7A, 7B and 7C are waveform diagrams useful in describing the invention as a change in effective capacitance is made.

DESCRIPTION OF THE PREFERRED EMBODIMENT

Figure 1:
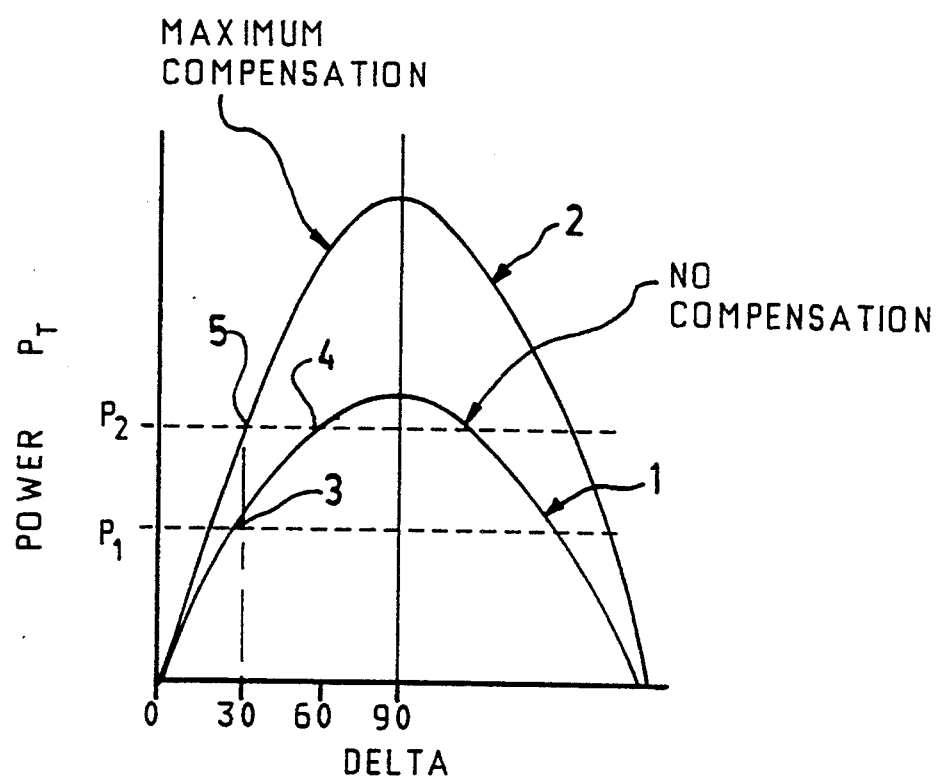
FIG. 1 is a graph of transmitted power plotted against the angle delta, useful in describing the invention.

Referring first to FIG. 1, there is shown a graph of power transmitted in a power transmission system plotted against the angle delta (the angle between the voltage at the source end of the system and the voltage at the load end or receiving end of a power transmission system). Curve 1 represents a transmission system with no compensation inserted to compensate for the inherent inductance of a transmission line, and curve 2 represents a transmission system with a predetermined maximum amount of compensation inserted. Suppose that power $P_1$ is being transmitted and the angle delta is about 30 degrees, as shown. The system is operating at point 3 on curve 1. If the load is rapidly increased to power $P_2$ the system will tend to follow curve 1 to point 4 where the angle delta has increased to about 60 degrees. If the maximum compensation is inserted, the operating point changes to point 5 on curve 2 where the angle delta is again about 30 degrees.

It will be seen that the reactance X of the system can be controlled with capacitive compensation. Rapid control enables any oscillations which may develop to be quickly controlled or damped.

Figure 2:
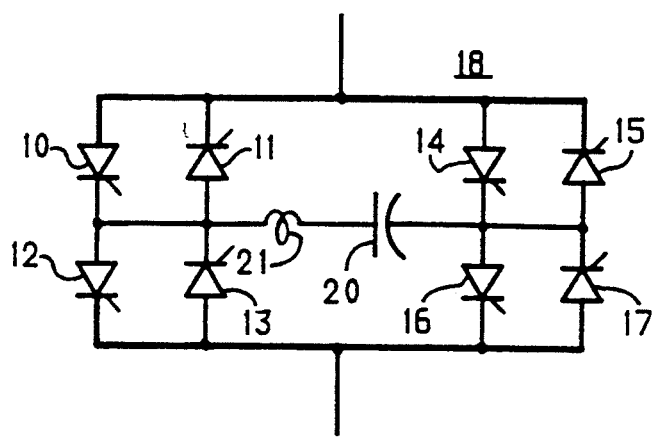
FIG. 2 is a schematic drawing of one form of the invention.
Figure 3:
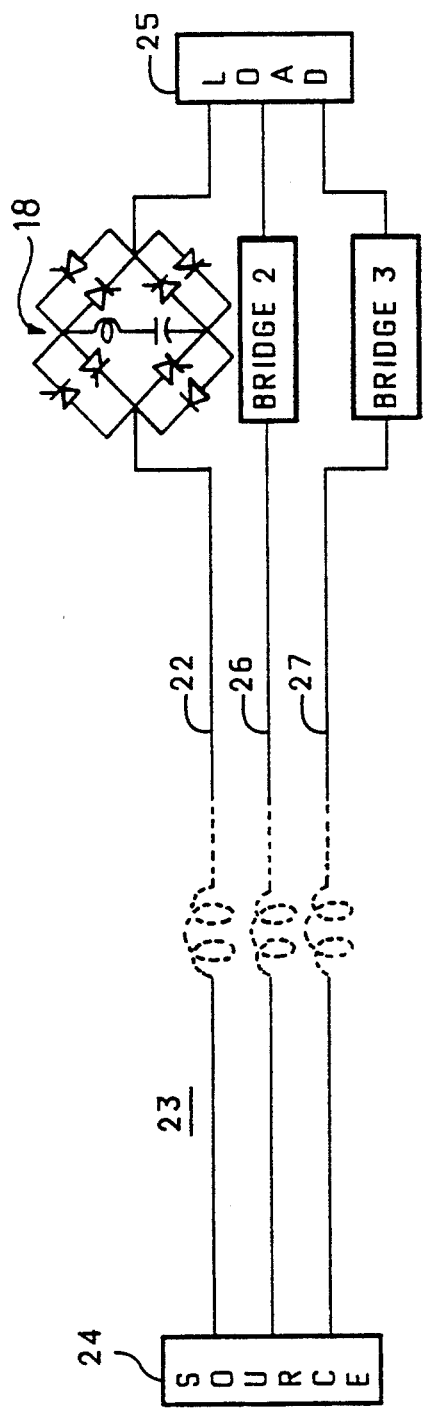
FIG. 3 is a schematic drawing of a transmission system which includes the invention.

Referring to FIG. 2, a thyristor bridge 18 is shown schematically having thyristors 10, 11, 12, 13, 14, 15, 16 and 17 connected in anti-parallel pairs as shown. Connected across the bridge is a capacitor 20 in series with a small surge-limiting inductor 21. As shown in FIG. 3, the bridge 18 may be connected in series in a conductor 22 of a transmission line 23 which extends between a source 24 and a load 25. The transmission line 23 also has conductors 26 and 27 with a respective bridge 2 and 3 similar to bridge 18. The system has a predetermined operating frequency or supply frequency which may, for example, be 60 Hz. Thus, FIG. 3 shows a three phase transmission line 23 extending between a source 24 (such as a generator or a plurality of generators, for example) and a load 25, with a respective bridge in each conductor of the transmission line for introducing a controlled amount of capacitive reactance to compensate for or to partly compensate for the inherent inductive reactance in the transmission line.

Figure 4:
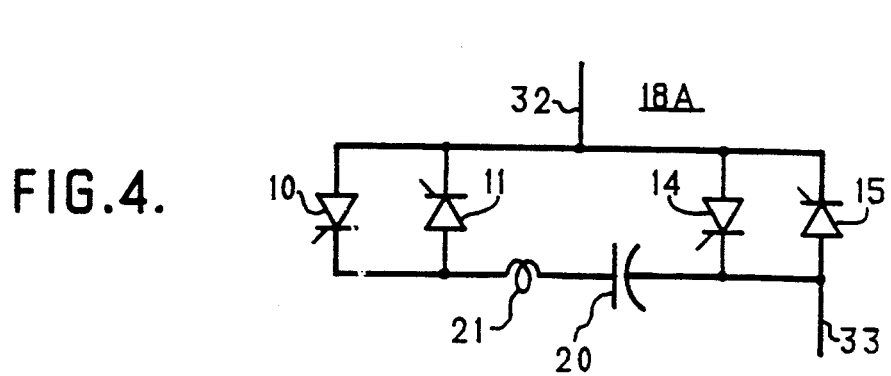
FIG. 4 is a schematic drawing of another form of the invention.

With reference now to FIGS. 2 and 4, it will be seen that, for the purpose of switching the capacitor 20 into a series path and for by-passing capacitor 20, it is not necessary to use the thyristors 12, 13 and 16, 17 of FIG. 2. Therefore the bridge 18 may be simplified, for the purpose of describing the invention in its simplest form, as shown in FIG. 4 as bridge 18A. It is the bridge 18A, or partial bridge 18A, or circuit arrangement 18A, that will form the basis of the following description.

Referring now to FIGS. 4 and 5, there is shown in FIG. 5A a voltage waveform 30 which has the first cycle beginning at time $t_0$ and going to time $t_8$. Also shown, in broken line, is a current waveform 31 (system current) which leads the voltage waveform 30 by 90 degrees. The waveform 30 may represent the voltage across the capacitor 20, and the waveform 31 may represent the current through capacitor 20, with thyristors 10 and 11 in the conducting state or condition (i.e. switched on) and thyristors 14 and 15 in the non-conducting state or condition. Suppose now that at time $t_1$ thyristor 14 is switched on. Current flows out of capacitor 20 and commutates off the thyristor 10. Thyristors 11 and 15 remain in the non-conducting state. Then the voltage across capacitor 20 will no longer increase. In fact there will be a small decrease due to the commutating flow out of the capacitor. The voltage across capacitor 20 is represented by waveform 34 in FIG. 5B, and it will be seen that the voltage is substantially constant from time $t_1$ to time $t_2$ (the small decrease in voltage is neglected for simplicity of drawing). The current flowing through thyristor 14 by-passes capacitor 20 and is represented by waveform 35 (FIG. 5D), and this is for the interval of time from $t_1$ to $t_2$. At time $t_2$ the thyristor 15 is switched on and thyristor 14 turns off at current zero. Current flows through thyristor 15 from time $t_2$ to time $t_3$ as shown by that portion of waveform 35. At time $t_3$ thyristor 11 is switched on and thyristor 15 is commutated to a non-conducting state by capacitor current. From time $t_3$ to time $t_5$ the current flow through capacitor 20 is represented by that portion of waveform 36 (FIG. 5C). At time $t_5$ thyristor 15 is switched on and thyristor 11 is commutated off. At time $t_6$ thyristor 14 is switched on and thyristor 15 is commutated off. At time $t_7$ thyristor 10 is switched on and thyristor 14 is commutated off. It is believed that the switching sequence for the remainder of the waveforms of FIG. 5 will be apparent. The waveforms of FIG. 5 represent a steady state condition, that is, a condition where there are no changes taking place.

Figure 6A:
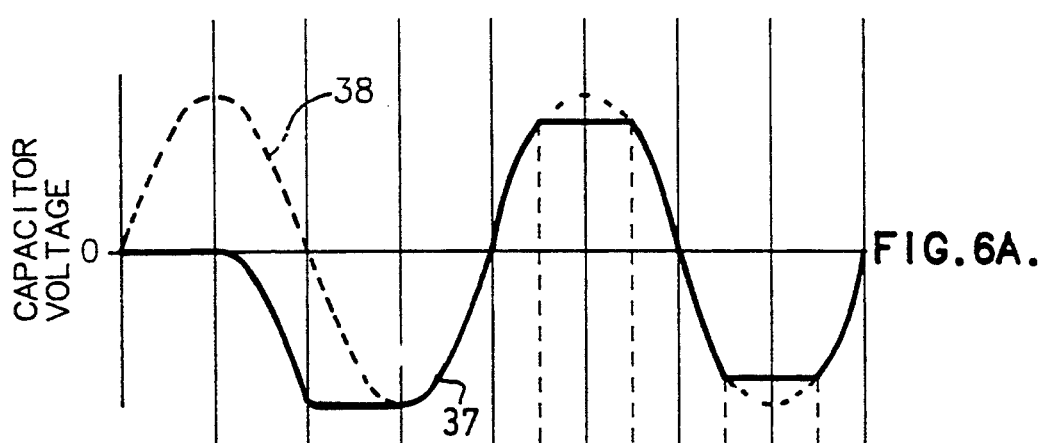
FIGS. 6A, 6B and 6C are waveform diagrams useful in describing the invention during start-up.
Figure 6B:
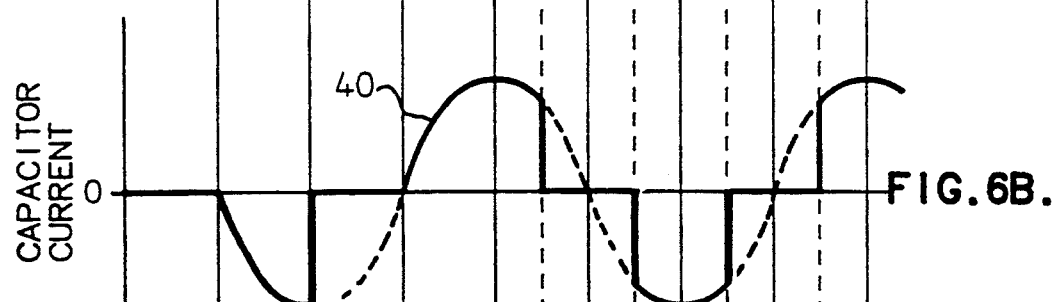
Figure 6C:
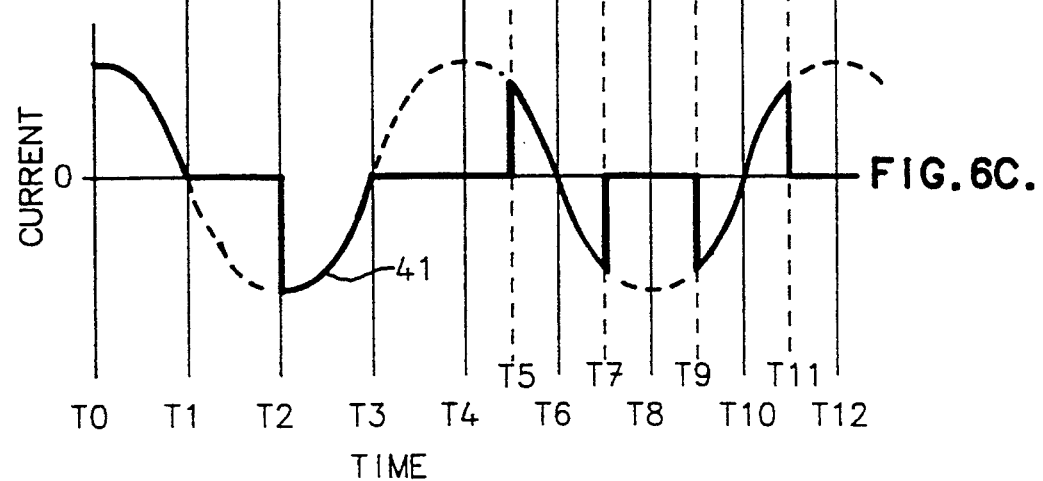

Referring now to FIG. 4 and to the waveforms of FIG. 6 which represent a start-up situation, waveform 37 (FIG. 6A) represents the voltage across capacitor 20. Waveform 38, shown by a dotted line, represents the potential voltage waveform which would appear across a conventional series capacitor of equivalent size caused by the flow of system current. At time $t_1$, when waveform 38 is at a maximum, thyristor 11 is switched on and the others are non-conducting. The charge on capacitor 20 begins to build up (negatively). Current begins to flow into capacitor 20 as shown by waveform 40 (FIG. 6B) following time $t_1$. At time $t_2$ when the voltage waveform 38 is passing through zero, thyristor 15 is switched on and thyristor 11 becomes non-conducting. Waveform 41 (FIG. 6C) beginning at time $t_2$ shows current flow by-passing capacitor 20. At time $t_3$ thyristor 10 is switched on and thyristor 15 is commutated off. Current flows positively into capacitor 20 as shown by waveform 40. At time $t_5$ thyristor 14 is switched on and thyristor 10 is commutated off. The voltage across capacitor 20 remains substantially constant from time $t_5$ until time $t_7$ as shown by waveform 37. At time $t_6$ thyristor 15 is switched on and thyristor 14 is commutated off. At time $t_7$ thyristor 11 is switched on and 15 is commutated off. The capacitor compensation circuit arrangement 18A is now in a running or steady state condition as described in connection with FIG. 5.

The capacitor compensation circuit arrangement 18A must, of course, be able to change the effective capacitance and this will be described with reference to FIG. 7.

Referring now to FIGS. 4 and 7, a waveform 42 (FIG. 7A) shows the voltage across capacitor 20 under various conditions, and waveforms 43 and 44 (FIG. 7B and 7C respectively) show current through capacitor 20 and current which by-passes capacitor 20.

At time $t_0$ a normal or steady state cycle begins as represented by waveform 42 from $t_0$ to $t_1$. During this interval thyristor 10 is conducting and the other thyristors are non-conducting. At time $t_1$ thyristor 14 is switched on and thyristor 10 is commutated off. The voltage across capacitor 20 no longer increases because capacitor 20 is effectively out of the circuit. This can be seen from waveform 42 (FIG. 7A) and waveform 43 (FIG. 7B).

At time $t_2$ thyristor 15 is switched on and thyristor 14 commutates off. The current during the interval $t_1$ to $t_3$ by-passes capacitor 20 as can be seen from waveform 44 over this interval.

At time $t_3$ thyristor 11 is switched on and thyristor 15 is commutated off. The voltage across capacitor 20 begins to fall due to the flow of system current (see waveform 43).

At time $t_4$ the voltage across capacitor 20 passes through zero (see waveform 42). A short time after this, at time $t_5$ for example, thyristor 15 is switched on and thyristor 11 commutates off. Current begins to flow through thyristor 15, by-passing capacitor 20 (see waveform 44 from $t_5$ to $t_6$). At time $t_6$ thyristor 14 is switched on and thyristor 15 is commutated off. Current continues to by-pass capacitor 20. Thus, from time $t_5$ to $t_7$ capacitor 20 is effectively out of the circuit, and the voltage across capacitor 20 is quite small (negatively).

At time $t_7$ which is close to the end of the first voltage cycle, thyristor 10 is switched on and thyristor 14 is commutated off. Current flows through capacitor 20 for a short time interval from time $t_7$ to $t_9$ when thyristor 14 is again switched on and thyristor 10 commutates off. It will be seen that the time interval represented by $t_7$ to $t_9$ is relatively short. This represents capacitive current flow (waveform 43 FIG. 7B).

Thyristor 14 is switched on from time $t_9$ to $t_{10}$ and thyristor 15 is switched on from time $t_{10}$ to $t_{11}$. At time $t_{11}$ thyristor 11 is switched on and thyristor 15 is commutated off. Current flows through thyristor 11 and capacitor 20 until time $t_{13}$.

As before, from time $t_{13}$ to $t_{14}$ thyristor 15 conducts and from time $t_{14}$ to $t_{15}$ thyristor 14 conducts. The voltage across capacitor 20 will remain substantially constant during this interval as seen from waveform 42. From time $t_{15}$ to $t_{17}$ thyristor 10 is switched on and the others are non-conducting. FIG. 7B shows the waveform 43 representing the current through the capacitor 20. It will be seen that turning thyristor 10 on closer to time $t_{14}$ and having it non-conducting closer to time $t_{18}$ will result in a longer interval when current flows through capacitor 20. Similarly, during the negative portion, if thyristor 11 were turned on closer to time $t_{10}$ and became non-conducting closer to time $t_{14}$ then current would flow through capacitor 20 for a longer time interval. In this manner the capacitive current can be controlled.

Figure 8:
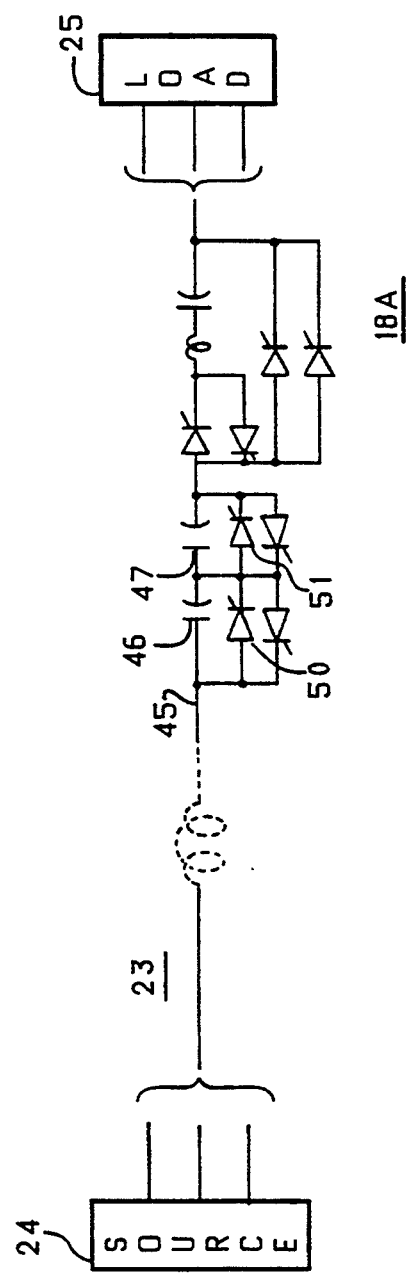
FIG. 8 is a schematic drawing of a transmission system which includes the invention and further means for controlling capacitive compensation.

Referring now to FIG. 8, there is shown a simplified schematic drawing of a high voltage transmission system incorporating the controlled capacitive compensation arrangement of this invention. A source 24 and a load 25 are shown as before. The transmission line 23 is represented by a single conductor 45. Two capacitors 46 and 47 (which represent capacitor banks) are connected in series in conductor 45, and anti-parallel thyristor switches 50 and 51 are connected in parallel with a respective capacitor 46 and 47. In series with capacitors 46 and 47 is a partial bridge circuit or capacitive compensation circuit arrangement 18A according to the invention. The capacitors 46 and 47 can be by-passed or left in series in the conductor 45 as required. The amount of capacitive impedance can be increased by using one or both of capacitors 46 and 47 in addition to the capacitive compensating circuit arrangement 18A. Thus the capacitive impedance can be smoothly and rapidly increased and decreased by using circuit arrangement 18A and adding capacitors 46 and 47 when needed.

Figure 9:
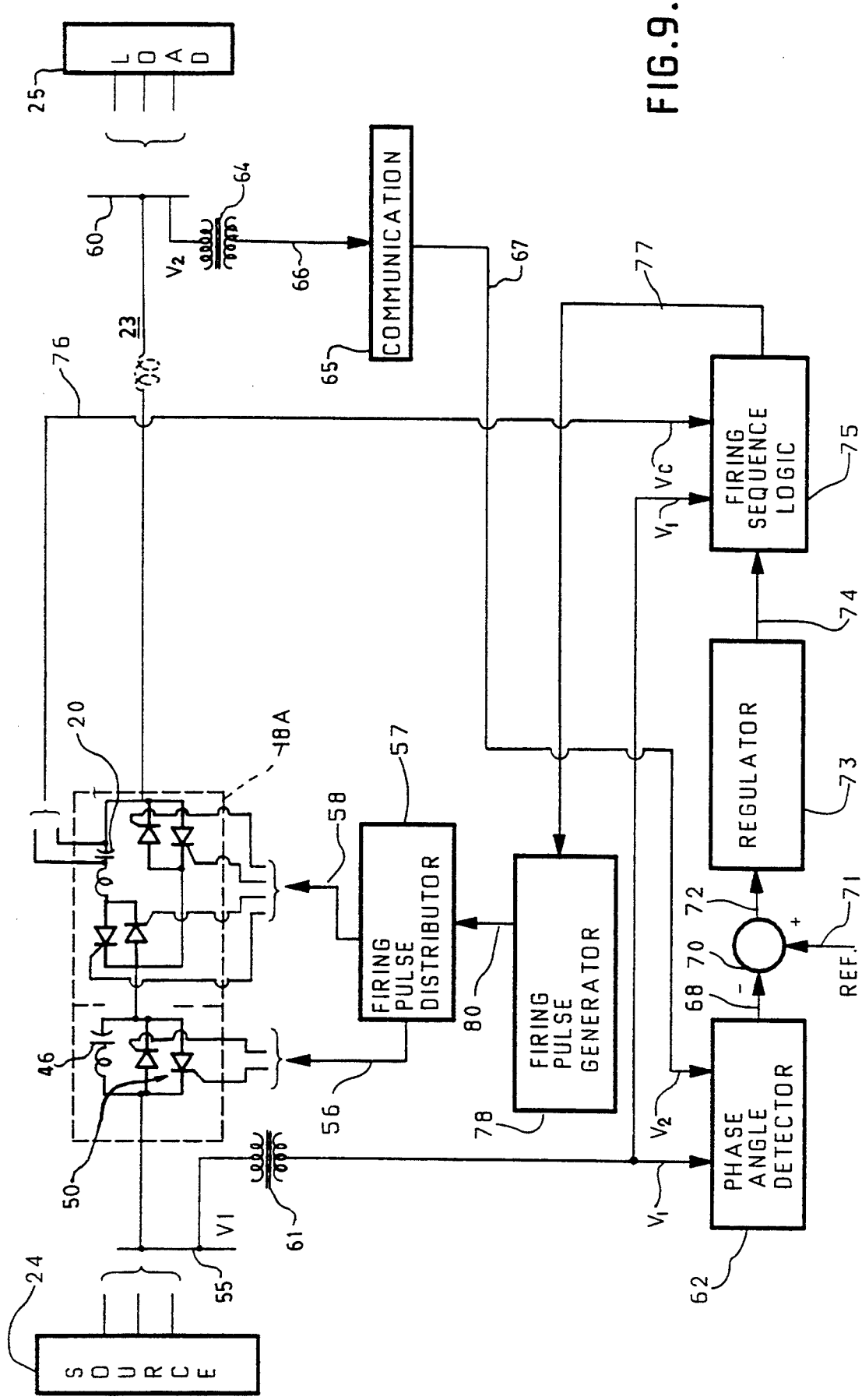
FIG. 9 is a schematic drawing, in block form, showing one form of control circuitry for the invention.

Referring now to FIG. 9, there is shown an AC source 24 and an AC load 25, as before. A bus 55 having an AC voltage $V_1$ represents the beginning of transmission line conductor 23. Inserted in transmission line 23 is a capacitor 46, representing a capacitor bank, that may be switched into the transmission line 23 or may be by-passed by anti-parallel thyristor switches 50. There may, of course, be more than one bank of capacitors (for example, capacitors 46 and 47, FIG. 8). Also in series with transmission line 23 is a capacitive compensation circuit arrangement 18A. The control electrodes of thyristors 50 are connected by conductors 56 to a firing pulse distributor 57. The control electrodes of the thyristors in capacitive compensation circuit arrangement 18A are connected by conductors 58 to firing pulse distributor 57. The transmission line 23 terminates at a bus 60 at load end 25. The voltage on bus 60 is $V_2$.

A potential transformer 61 is connected to bus 55 and applies a signal representing voltage $V_1$ to a phase angle detector circuit 62 over conductor 63. A potential transformer 64 is connected to bus 60 and applies a signal representing $V_2$ to a communications device 65 over conductor 66. The communications device 65 may represent a radio link, a wire link or the like, and a path 67 connects the device 65 to a phase angle detector circuit 62 to apply thereto a signal representing $V_2$. The phase angle detector circuit derives a signal representing the phase angle between $V_1$ and $V_2$, that is, the angle referred to as delta, and it provides this signal on conductor 68 to an adder 70. Also applied to adder 70, over conductor 71, is an angle reference signal. The resulting difference signal on conductor 72 is applied to a regulator 73 which may limit or regulate amplitude or rate of change. The resulting signal on conductor 74 is applied to a firing sequence logic circuit 75. Also applied to the firing sequence logic circuit 75 is a signal representing $V_1$ from conductor 63, and a signal representing $V_C$, the voltage across capacitance 20 (see also FIGS. 2 and 4). The signal representing $V_C$ is determined directly from capacitance 20 in the capacitive compensating circuit arrangement 18A and provided via conductor 76. The output from firing sequence logic circuit 75 is provided over conductor 77 to a firing pulse generator 78 which, in turn, provides signals on conductor 80 to the firing pulse distributor 57. The firing pulse distributor 57 provides appropriate signals on conductors 56 and 58 to gate on desired thyristors at desired times as was explained with reference to the waveforms of FIGS. 5, 6 and 7.

It should be understood that any or all of the conductors used to transmit signals or gate thyristors may be in practise replaced by light fibers.

Figure 10:
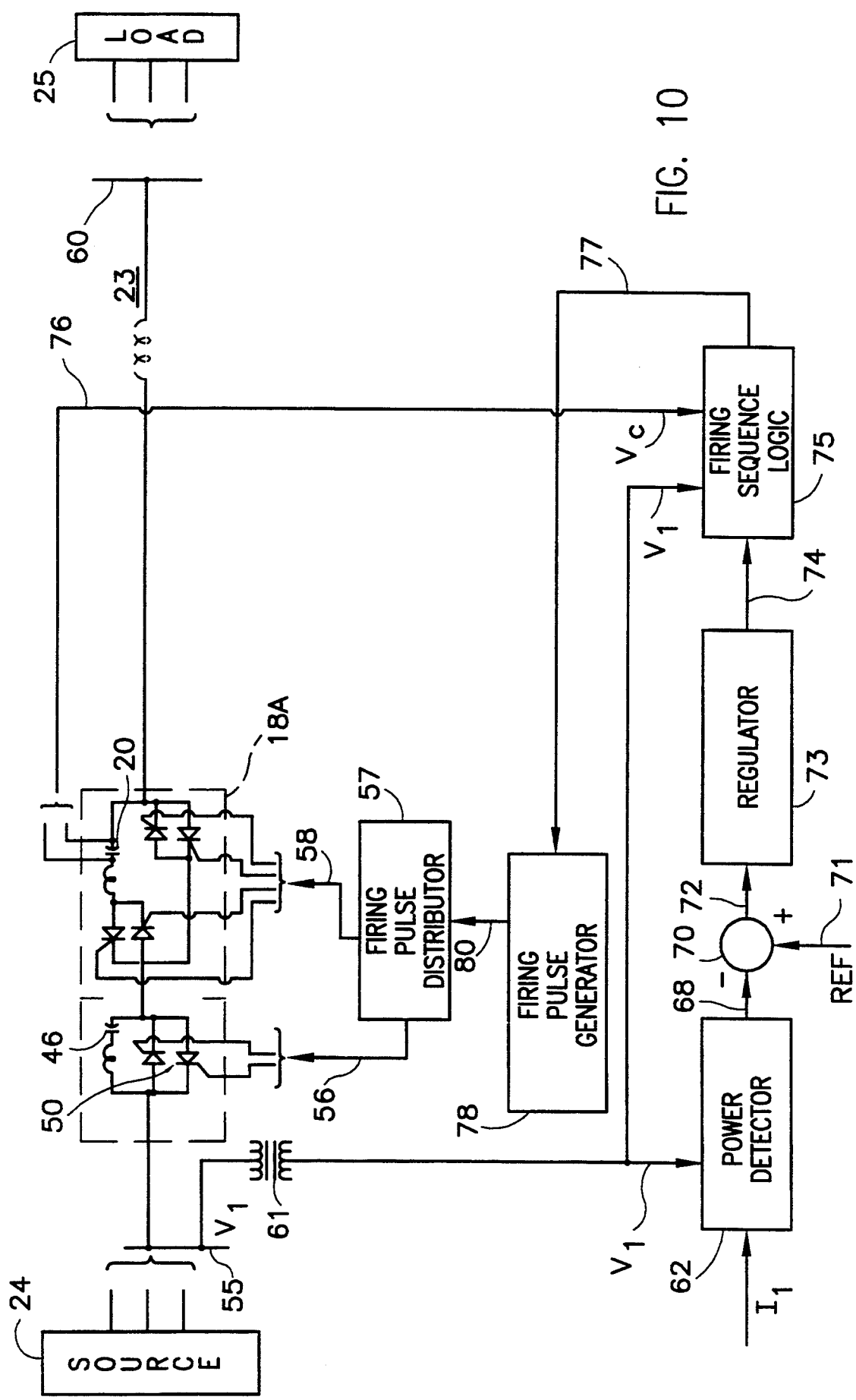
FIG. 10 is a schematic drawing, in block form, showing a modified form of control circuitry for the invention.

Because the angle delta, the reactance and the power transmitted are related, it is possible to use detectors other than the phase angle detector 62. For example, a power transducer, shown at 62 in FIG. 10 having as inputs system current and voltage signals $I_1$ and $V_1$, respectively, could provide a suitable signal to adder 70. The reference signal on conductor 71, in this case, would be a power reference signal. The signal provided to regulator 73 would be quite suitable for deriving a firing sequence signal to effect a satisfactory control.

The thyristors can be gated on quickly and precisely to provide rapid, simple and accurate amounts of capacitive compensation in a transmission system. Not only can the net reactance be controlled but the response is sufficiently rapid to provide damping for undesired oscillations which might occur in a power transmission system.

What I claim as new and desire to secure by Letters Patent of the United States is:

1. A power transmission system having a source of AC power at a predetermined supply frequency and a load for receiving AC power, said source and said load being connected by a transmission line, said transmission line having inductance and a series capacitor connected therein, and a compensating circuit arrangement for varying the effective reactance of the series capacitor in a smooth manner, said compensating circuit arrangement comprising:
   first anti-parallel connected thyristors in series with said capacitor,
   second anti-parallel connected thyristors and a bypass circuit connecting said second thyristors in parallel with said first thyristors and said capacitor, said bypass circuit having an impedance that is so low that said capacitor is effectively out of said power transmission line when one of said second thyristors is conducting current through said bypass circuit, and
   control means for controlling the conductance of said first and second thyristors at desired times during each cycle of said supply frequency for varying the effective reactance of the capacitor.

2. A compensating circuit arrangement for series connection in a conductor of a power transmission line which connects a power source to a load, said power source having a predetermined frequency, comprising:
   first anti-parallel connected thyristors each having a control electrode for gating on the respective first thyristor,
   a capacitor connected in series with said first thyristors,
   second anti-parallel connected thyristors each having a control electrode for gating on the respective second thyristor,
   a bypass circuit connecting said second thyristors in parallel with said first thyristors and said capacitor, said bypass circuit having an impedance that is so low that said capacitor is effectively out of said power transmission line when one of said second thyristors is gated on, and
   control means responsive to changing conditions in said power transmission line, connected with said control electrodes for gating on respective ones of said first and second thyristors at desired times in a cycle of said frequency for varying the effective reactance of the capacitor in a smooth manner.

3. A compensating circuit arrangement as defined in claim 2 in which said thyristors are silicon controlled rectifiers.

4. A compensating circuit arrangement as defined in claim 2 and further comprising a surge limiting inductor in series with said first thyristors and said capacitance for limiting the rate of change of current in said circuit.

5. A capacitive compensation arrangement for series connection in a power transmission line which connects a power source having a predetermined supply frequency to a load, comprising
   a bridge arrangement for series connection in said power transmission line, each arm of said bridge comprising anti-parallel connected thyristors, said bridge arrangement having a capacitor switchable in series with said transmission line and one arm of said bridge and switchable to a capacitor by-passed condition wherein the capacitor and said one arm are bypassed by another arm of said bridge by controlling the times during which the thyristors conduct, thereby varying the effective reactance of said capacitor, said other arm forming a bypass circuit around said one arm and said capacitor, said bypass circuit having an impedance that is so low that said capacitor is effectively out of said power transmission line when one of said thyristors in said other arm is conducting current through said bypass circuit, and
   control means for controlling the times during each cycle of the supply frequency that each thyristor is in a conducting state.

6. A capacitive compensation arrangement for series connection in a power transmission line of a power system, said transmission line connecting a power source having a predetermined supply frequency to a load, comprising
   a bridge arrangement having four arms, the first arm extending between first and second connecting points, the second arm extending between said second connecting point and a third connecting point, the third arm extending between said third connecting point and a fourth connecting point, and said fourth arm extending between said fourth connecting point and said first connecting point, each arm comprising anti-parallel connected thyristors, said first and third connecting points being connected to said transmission line for connecting said bridge arrangement in series therewith, and a compensating capacitor connected between said second and fourth connecting points, said fourth arm forming a first bypass circuit around said first arm and said capacitor, said first bypass circuit having an impedance that is so low that said compensating capacitor is effectively out of said power transmission line when one of the thyristors in said first bypass circuit is gated to a conducting state, said third arm forming a second bypass circuit around said second arm and said capacitor, said second bypass circuit having an impedance that is so low that said compensating capacitor is effectively out of said power transmission line when one of the thyristors in said second bypass circuit is gated to a conducting state, and
   control means responsive to conditions in said power transmission line for controlling the times during each cycle of said supply frequency that each thyristor is gated to a conducting state, thereby varying the effective reactance of said capacitor.

* * * * *